(12) United States Patent
Nelson et al.

(10) Patent No.: US 7,179,172 B2
(45) Date of Patent: Feb. 20, 2007

(54) UNIVERSAL JOINT

(75) Inventors: David Nelson, Chicago, IL (US); William Stern, Dyer, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/366,131

(22) Filed: Mar. 2, 2006

(65) Prior Publication Data

US 2006/0148580 A1 Jul. 6, 2006

Related U.S. Application Data

(62) Division of application No. 10/760,053, filed on Jan. 16, 2004, now Pat. No. 7,037,199.

(51) Int. Cl.
*F16D 3/40* (2006.01)
(52) U.S. Cl. ........................................................ 464/14
(58) Field of Classification Search .................... 464/7, 464/10–16; 384/127; 403/37
See application file for complete search history.

(56) References Cited

U.S. PATENT DOCUMENTS

| 3,470,711 | A | 10/1969 | Kayser |
| 4,103,512 | A | 8/1978 | McElwain et al. |
| 4,611,786 | A | 9/1986 | Jorgensen et al. |
| 4,650,440 | A | 3/1987 | Fisher |
| D331,348 | S | 12/1992 | Park |
| 5,813,916 | A | 9/1998 | Lentini et al. |
| 5,829,888 | A | 11/1998 | Bhargava et al. |
| D402,558 | S | 12/1998 | Kilmu et al. |
| 6,264,566 | B1 | 7/2001 | Nieman et al. |
| 6,540,616 | B2 | 4/2003 | Miller et al. |
| 6,827,649 | B2 | 12/2004 | Menosky et al. |

OTHER PUBLICATIONS

Webster's Third New International Dictionary, Unabridged, Merriam-Webster, Inc., 1993 retrieved on May 4, 2006. Retrieved from the Internet: URL: http://lionreference.chadwyck.com.*
Catalog Page—Knobs Unlimited, Inc.—Universal Joint Cup Spacers—Thrust Washers—Part Name: "Thrust Washer and Valve Combination—Universal Yoke Trunnion Bearing"—Part No. 10600-53-0 (Dec. 2, 1970) 1page.
Catalog Page—Knobs Unlimited, Inc.—Universal Joint Cup Spacers—Thrust Washers—Part Name: "Thrust Washer and Valve Combination—Universal Yoke Trunnion Bearing"—Part No. 10600-54 (May 10, 1971) 1 page.

* cited by examiner

*Primary Examiner*—Greg Binda
(74) *Attorney, Agent, or Firm*—Dickinson Wright PLLC

(57) ABSTRACT

A universal joint having a cross-member journal or trunnion with a lubrication chamber includes a combination of a thrust washer and lubrication baffle press fit into the lubrication chamber. The thrust washer and lubrication baffle incorporate one or more lubrication grooves, facilitating the flow of lubricant between the surfaces of the cross-member and bearing cap. Elastomeric properties of the thrust washer eliminate the need for grinding of the journal surfaces to desired tolerances, while incorporation of lubrication grooves into the thrust washer surface eliminates the need for pressing of lubrication grooves directly into the journal ends prior to hardening or heat treating.

13 Claims, 2 Drawing Sheets

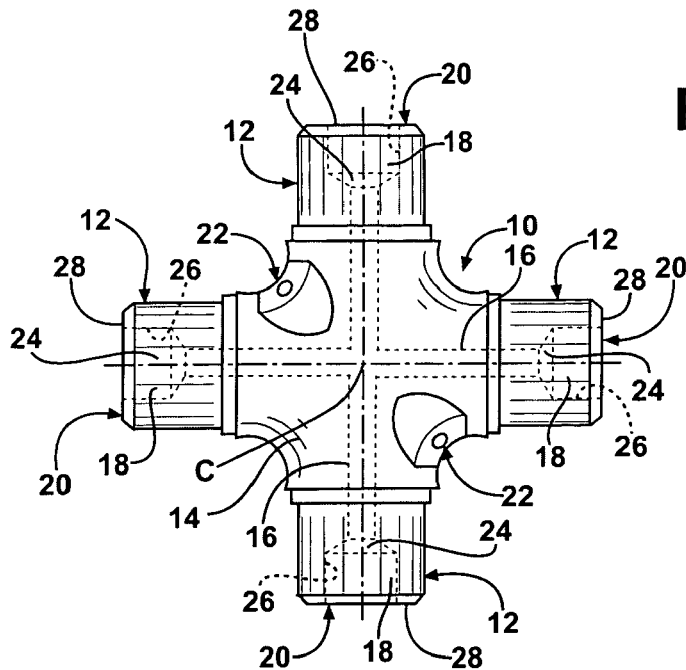
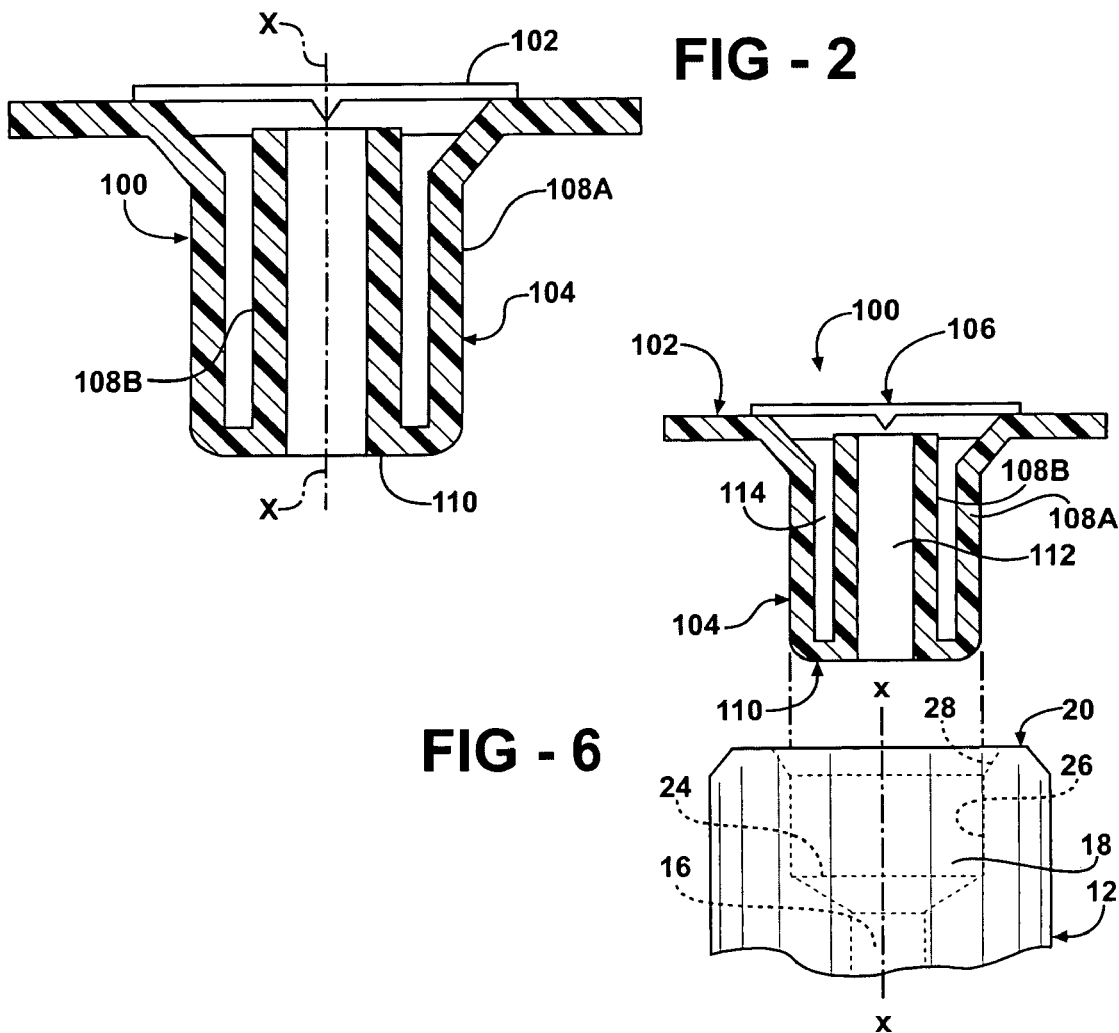

UNIVERSAL JOINT

CROSS-REFERENCE TO RELATED APPLICATIONS

This patent application is a division of and claims priority to U.S. Pat. No. 7,037,199, filed Jan. 16, 2004, and which is incorporated herein by reference in its entirety.

BACKGROUND OF THE INVENTION

1. Technical Field

The present invention relates generally to universal joints having cross-member journals provided with internal lubrication channels which open at the ends of the journals to provide for replenishment of lubricant in bearing cups within which the journals are pivotally supported in respective yoke members, and in particular, to such a universal joint having a washer and lubrication baffle press-fit within an enlarged end portion of the lubrication channel.

2. Related Art

Typically, within the cross-members or trunnions of a universal joint, the lubrication channels intersect at a central location, adjacent an external lubrication fitting, whereby lubricant can be introduced to the universal joint when required, as shown in U.S. Pat. No. 4,103,512 to McElwain, et al. The lubricant introduced to the central location of the universal joint typically flows radially outward towards the ends of the cross-member journals through the individual lubrication channels. During operation, the rotational movement of the universal joint about an axis perpendicular to the cross-members generates centrifugal forces which assists the outward flow of lubricant to the bearing cups.

When rotation of the universal joint is stopped, one or more of the journals may be disposed in a vertically upward orientation, such that the force of gravity acts to draw lubricant back downward from the bearing cups and into the lubrication channels. Upon resumption of rotational motion, the associated bearing caps may be left with little or no lubricant, resulting in higher frictional forces and undesired wear.

In addition to the use of lubricant to reduce frictional wear between the cross-member ends and bearing caps, manufacturers often dispose a thrust washer as a buffer between the inner surface of the bearing cap and the cross-member or trunnion end, such as is shown in U.S. Pat. No. 6,264,566 B1 to Nieman et al., or in U.S. Pat. No. 5,813,916 to Lentini, et al. During manufacture, these thrust washers are installed in the bearing caps prior to placement over the cross-member ends, using spacers to ensure proper location. The corresponding faces of the cross-member ends are ground in a machining operation to ensure a desired tolerance for the thrust washers, and are pressed to provide for one or more lubrication grooves facilitating a flow of lubricant between the thrust washer and the cross-member end.

Accordingly, it is an object of the present invention to overcome the potential problems associated with lubricant drainage from the proximity of the bearing cups in a universal joint while simultaneously eliminating one or more grinding and machining steps from the universal joint manufacturing process.

BRIEF SUMMARY OF THE INVENTION

Briefly stated, the present invention provides a universal joint having a cross-member journal or trunnion with an enlarged lubrication chamber in a lubrication passage thereof which has a combination of a thrust washer and lubrication baffle press-fit into the lubrication chamber. The combination thrust washer and unitary lubrication baffle incorporates one or more lubrication grooves, facilitating the flow of lubricant between the surfaces of the cross-member and bearing cap. Elastomeric properties of the thrust washer eliminate the need for grinding of the cross-member ends to desired tolerances, and the incorporation of lubrication grooves into the thrust washer surface eliminates the need for pressing of lubrication grooves directly into the cross-member ends prior to hardening or heat treating.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a plan view of a prior art universal joint cross member;

FIG. 2 is a side sectional view of a washer baffle of the present invention;

FIG. 6 illustrates the placement of a washer baffle of FIG. 2 in a cross member.

Corresponding reference numerals indicate corresponding parts throughout the several figures of the drawings.

DESCRIPTION OF THE PREFERRED EMBODIMENT

Figure 3:
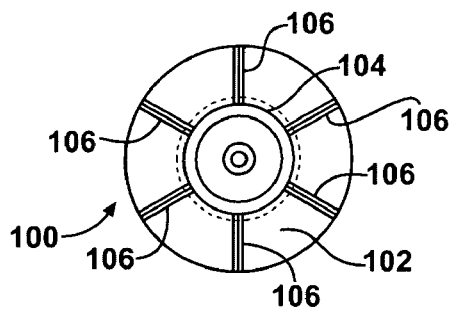
FIG. 3 is a top plan view of the washer baffle of FIG. 2.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Turning to FIG. 1, a conventional Hookes-type universal joint cross-member or trunnion is shown generally at 10. The cross-member 10 consists of four equidistantly spaced journals 12 disposed about a central body 14. A lubricant channel 16 extends axially through each journal 12, from a common central point C, to an open-ended lubrication chamber 18 adjacent a radially outward end 20 of each journal 12. At the central point C in the central body 14, one or more lubricant access passages 22 are provided for the introduction of a lubricant into the lubricant channels 16.

Each lubrication chamber 18 is defined by an enlarged diameter portion of the associated lubrication channel 16 having a generally frustoconical radially inner surface 24 receiving the lubrication channel 16, and cylindrical sidewalls 26. The radially outer end of the lubrication chamber 18 is open, and includes a chamfered peripheral edge 28 transitioning between the cylindrical sidewalls 26 and the outward end 20 of the journal 12.

Figure 4:
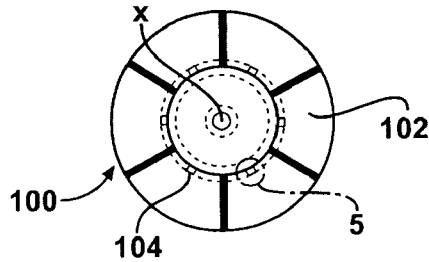
FIG. 4 is a bottom plan view of the washer baffle of FIG. 2.

Turning to FIGS. 2–4, an washer baffle combination of the present invention is shown generally at 100. The washer baffle consists of a thrust washer portion 102, and an associated baffle portion 104 adapted for press-fitting into the lubrication chamber 18 of a universal joint journal 12. Preferably, the thrust washer portion 102 and the associated baffle portion 104 are of a unitary elastomeric construction. One suitable material from which the washer baffle combination may be formed using conventional plastic forming techniques is a nylon elastomer identified as DuPont 70G33L, and sold under the "Zytel" brand name by E. I. duPont de Nemours & Co. of Wilmington, Del. Those of ordinary skill in the art will recognize that other materials, not limited to elastomers, may be utilized in the construction of the washer baffle combination 100 of the present invention, provided that necessary tolerances for wear, temperature, and elasticity are met.

As best seen in FIG. 3, the thrust washer portion 102 of the washer baffle 100 defines an annular surface substantially corresponding to the dimensions of the radially outward end 20 of a journal 12. Disposed in at least the upper surface of the thrust washer portion 102 are a plurality of equidistantly spaced lubricant grooves 106 radiating outward from a central axis X of the thrust washer portion 102. Optionally, lubricant grooves 106 may be provided in the lower surface of the thrust washer portion 102 as well.

Figure 5:
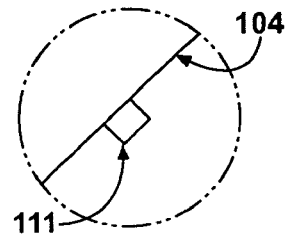
FIG. 5 is an enlargement of a portion of FIG. 4, illustrating a vertically aligned rib for press-fit attachment to a cross-member.

Associated with the thrust washer portion 102, the baffle portion 104 is disposed concentrically about the central axis X, perpendicular to the lower surface of the thrust washer portion 102. The baffle portion 104 is defined by a pair of concentric cylindrical elements 108A and 108B joined together by an annular base 110. Cylindrical element 108A defines the outer cylindrical surface of the baffle portion 104, and is preferably contiguous with the thrust washer portion 102. As best seen in FIG. 5, the outer surface of the cylindrical element 108A preferably includes a plurality of ribs 111 aligned parallel to the central axis X. Each rib 111 is configured to provide a press fit engagement with an inner surface of the journal lubrication chamber 18. Cylindrical element 108B defines an inner cylindrical surface of the baffle portion 104, as well as an open ended axial lubrication delivery passage 112. The annular base 110 joins the concentric cylindrical elements 108A and 108B opposite the thrust washer portion 102, defining an annular lubrication retaining volume 114 concentric with the axial lubrication delivery passage 112. Preferably, the annular base 110 and the cylindrical element 108B are contiguous with the cylindrical element 108A, however, those of ordinary skill in the art will recognize that the components of the washer baffle combination 100 may be formed discretely and joined in conventional manners to provide the equivalent functionality of contiguously formed components.

Figure 7:
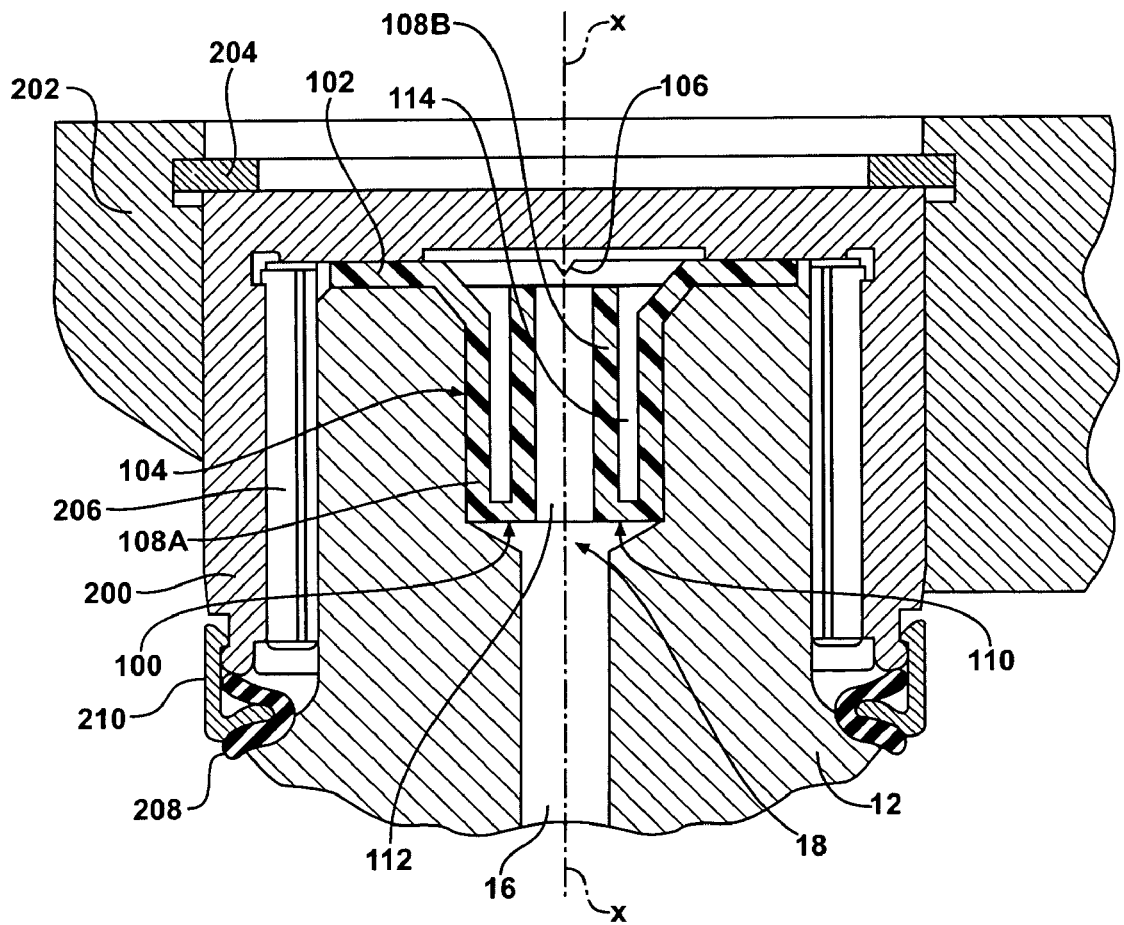
FIG. 7 is a sectional view of a washer baffle of FIG. 2 press fitted to a cross-member of a universal joint.

Turning to FIGS. 6 and 7, a press-fit insertion of the thrust washer baffle combination 100 axially into the lubrication chamber 18 of a journal 12 is shown. As the thrust washer baffle combination 100 is press-fitted to the lubrication chamber 18, ribs 111 ensure sufficient engagement between the outer surface of the cylindrical element 108A and the surfaces of the lubrication chamber 118, retaining the thrust washer baffle combination therein in a centered position. Upon complete insertion into the lubrication chamber 118, the underside of the thrust washer portion 102 is seated against the journal outward end 20, and the axial lubrication delivery passage 112 is disposed coaxially with the lubrication channel 16 to receive a flow of lubricant there from. Elastomeric properties of the thrust washer portion 102 function to provide a limited range of tolerance for dimensional variations in the journal 12 and journal outward end 20, eliminating the need to grind surfaces of the journal 20 to precise tolerances during a manufacturing process.

Once the thrust washer baffle combination 100 is seated in the lubrication chamber 18 of a journal 12, as shown in FIG. 7, a bearing cup 200 is fitted over the thrust washer portion 102 and journal outward end 20. The bearing cup 200 is retained in a limb 202 of a joint yoke by a snap ring 204. Needle roller bearings 206 are disposed between the outer circumferential surface of the journal 12 and the inner circumferential side wall of the bearing cup 200. An annular seal 208 in a carrier 210 retains lubricant and excludes contaminants from the inside of the bearing cap 200.

During operation of a universal joint including one or more thrust washer baffle combinations 100 of the present invention, lubricant flows radially outward from the center of the universal joint cross-member 10 along the respective lubrication channels 16, towards the journal outer ends 20. When the lubricant flow enters the lubrication chamber 18, outward flow is restricted by the annular base 110 to flow through the open ended axial lubrication delivery passage 112, where it is delivered to the journal outer end 20. From the journal outer end 20, the lubricant flow continues between the various surfaces of the thrust washer portion 102, along the equidistantly spaced lubricant grooves 106 to provide lubrication to the needle bearings 206 and other wear surfaces. When rotational motion of the universal joint stops and the flow of lubricant reverses, such as due to the influence of gravity, a volume of lubricant is retained in the annular volume 114, and prevented from returning to the lubricant channel 16, thereby ensuring an adequate lubricant supply at the journal outer end 20 upon a resumption of rotational motion.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A universal joint, comprising:
   at least one journal including a cylindrical outer wall and an outward end forming a thrust face, said journal having an axial lubrication channel therein, said channel having a lubricant chamber at the outermost end thereof;
   a bearing cup rotatably surrounding said cylindrical outer wall of said journal and having an inner thrust surface opposing said outward end of said journal; and
   a lubricant retention and bearing component comprising an annular thrust washer portion having an upper surface and a lower surface and having at least one radial lubrication channel disposed on at least one of the upper surface and the lower surface, said annular thrust washer portion simultaneously contacting said outward end of said journal end and said inner thrust surface of said bearing cup to provide a sliding bearing interface therebetween, said lubrication retention and bearing component further including a cylindrical baffle portion perpendicular to, and coaxial with, said annular thrust washer portion, a generally rigid cylindrical element coaxially disposed within said cylindrical baffle portion, said cylindrical element perpetually open at opposite ends and defining an axial lubrication delivery passage, and an annular base contiguously coupling said cylindrical baffle portion to said cylindrical element opposite from said annular thrust washer portion, said component press fit into said lubrication chamber, wherein said cylindrical baffle portion, said annular base, and said cylindrical element cooperatively define an annular lubrication retaining volume concentric with said axial lubrication delivery passage and an end of said cylindrical element opens adjacent said annular thrust washer portion.

2. The universal joint of claim 1, wherein the at least one radial lubrication channel comprises a plurality of radial lubrication channels disposed on at least one of the upper surface and the lower surface of said annular thrust washer portion.

3. The universal joint of claim 2, wherein the plurality of radial lubrication channels are radially equidistant.

4. The universal joint of claim 1, further comprising a plurality of axially aligned ribs on an outer peripheral surface of said cylindrical baffle portion.

5. The universal joint of claim 1, wherein said annular thrust washer portion, said cylindrical baffle portion, said cylindrical element, and said annular base are of unitary construction.

6. The universal joint of claim 5, wherein said annular thrust washer portion, said cylindrical baffle portion, said cylindrical element and said annular base comprise an elastomeric material.

7. The universal joint of claim 6, wherein the elastomeric material comprises nylon.

8. The universal joint of claim 1, wherein at least said thrust washer portion is elastomenc.

9. The universal joint of claim 1, comprising a frusto-conical chamfer disposed between the upper surface of said annular thrust washer portion and an inner surface of said cylindrical baffle portion.

10. The universal joint of claim 1, wherein the end of said cylindrical element which opens adjacent said annular thrust washer portion is disposed below the upper surface of said annular thrust washer portion.

11. The universal joint of claim 1, wherein said at least one journal comprises a plurality of journals.

12. The universal joint of claim 11, wherein the plurality of journals comprises four journals arranged as a cross-member.

13. The universal joint of claim 1 further comprising at least one yoke which supports said at least one bearing cup.

* * * * *